(12) United States Patent
Christiansen et al.

(10) Patent No.: US 10,140,461 B2
(45) Date of Patent: Nov. 27, 2018

(54) REDUCING RESOURCE CONSUMPTION ASSOCIATED WITH STORAGE AND OPERATION OF CONTAINERS

(71) Applicant: Microsoft Technology Licensing, LLC, Redmond, WA (US)

(72) Inventors: Neal R. Christiansen, Bellevue, WA (US); Scott Brender, Kirkland, WA (US); Sarosh Havewala, Redmond, WA (US); Malcolm James Smith, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 15/074,273

(22) Filed: Mar. 18, 2016

(65) Prior Publication Data

US 2017/0124345 A1 May 4, 2017

Related U.S. Application Data

(60) Provisional application No. 62/249,078, filed on Oct. 30, 2015.

(51) Int. Cl.
*G06F 21/62* (2013.01)
*H04L 29/08* (2006.01)
(Continued)

(52) U.S. Cl.
CPC .......... *G06F 21/6218* (2013.01); *G06F 9/455* (2013.01); *G06F 9/5016* (2013.01);
(Continued)

(58) Field of Classification Search
CPC .......... G06F 21/6218; G06F 17/30091; G06F 17/30138; H04L 67/10
See application file for complete search history.

(56) References Cited

U.S. PATENT DOCUMENTS

| 6,061,743 A | 5/2000 | Thatcher et al. |
| 7,496,565 B2 | 2/2009 | Thind et al. |
(Continued)

OTHER PUBLICATIONS

"Second Written Opinion Issued in PCT Application No. PCT/US2016/058420", dated Jul. 10, 2017, 6 Pages.
(Continued)

*Primary Examiner* — Yonas A Bayou
(74) *Attorney, Agent, or Firm* — Jacob P. Rohwer; Newport IP, LLC (57) ABSTRACT

The techniques and systems described herein reduce the amount of storage resources consumed by containers by creating placeholder files in container namespaces. The placeholder files are associated with read-only access to corresponding shared files stored in a read-only namespace. The read-only namespace can be accessible to multiple different containers. This increases the storage density for a storage unit because more containers can be executed from the same storage unit. The techniques and systems described herein further reduce the amount of storage resources consumed by containers by creating placeholder directories. The techniques and systems described herein also reduce the amount of memory storage resources consumed by containers to execute files by using a shared execution memory area.

18 Claims, 8 Drawing Sheets

(51) Int. Cl.
*G06F 17/30* (2006.01)
*G06F 9/455* (2018.01)
*G06F 9/50* (2006.01)

(52) U.S. Cl.
CPC ...... *G06F 9/5022* (2013.01); *G06F 17/30091* (2013.01); *G06F 17/30138* (2013.01); *G06F 17/30233* (2013.01); *H04L 67/10* (2013.01)

(56) References Cited

U.S. PATENT DOCUMENTS

| | | | |
|---|---|---|---|
| 7,584,219 B2 | 9/2009 | Zybura et al. | |
| 7,610,307 B2 | 10/2009 | Havewala et al. | |
| 7,783,677 B2 | 8/2010 | Li et al. | |
| 8,201,029 B2* | 6/2012 | Jann | G06F 9/542 707/705 |
| 8,656,386 B1 | 2/2014 | Baimetov | |
| 8,775,625 B2* | 7/2014 | Narayanaswamy | G06F 9/4856 709/226 |
| 9,357,568 B2* | 5/2016 | Al-Shalash | H04L 65/1016 |
| 9,424,267 B2* | 8/2016 | Bagal | G06F 17/30144 |
| 9,451,044 B2* | 9/2016 | Nord | H04L 67/306 |
| 9,542,408 B2* | 1/2017 | Moss | G06N 3/02 |
| 9,606,629 B2* | 3/2017 | Binyamin | G06F 3/017 |
| 9,886,189 B2* | 2/2018 | Zaveri | G06F 3/067 |
| 9,960,932 B2* | 5/2018 | Constantinou | H04L 51/10 |
| 9,965,151 B2* | 5/2018 | Zaveri | G06F 3/017 |
| 9,971,977 B2* | 5/2018 | Marti | G06Q 10/06 |
| 2002/0095479 A1 | 7/2002 | Schmidt | |
| 2005/0066059 A1 | 3/2005 | Zybura et al. | |
| 2008/0091702 A1* | 4/2008 | Pudipeddi | G06F 17/30581 |
| 2009/0182778 A1* | 7/2009 | Tormasov | G06F 17/30165 |
| 2014/0006465 A1 | 1/2014 | Davis et al. | |
| 2014/0280392 A1 | 9/2014 | Christiansen et al. | |
| 2014/0280397 A1 | 9/2014 | Rajpal et al. | |
| 2014/0324776 A1 | 10/2014 | Novak et al. | |

OTHER PUBLICATIONS

Anderson, et al., "Global Namespace for Files", IBM Systems Journal, vol. 43, Iss. 4, Apr. 6, 2004, pp. 702-722.
Lu, et al., "Physical Disentanglement in a Container-Based File System", in the Proceedings of 11th USENIX Symposium on Operating Systems Design and Implementation, Oct. 6, 2014, pp. 1-16.
PCT/US2016/058420—ISR and WO dated Feb. 22, 2017, 10 pages.
International Preliminary Report on Patentability Issued in PCT Application No. PCT/US2016/058420, dated Jan. 29, 2018, 7 Pages.

* cited by examiner

REDUCING RESOURCE CONSUMPTION ASSOCIATED WITH STORAGE AND OPERATION OF CONTAINERS

PRIORITY APPLICATION

This application claims the benefit of and priority to U.S. Provisional Application No. 62/249,078, filed Oct. 30, 2015, the entire contents of which are incorporated herein by reference.

BACKGROUND

A host entity can implement separate containers to execute separate run-time environments, where a run-time environment includes processes. A container relies upon access to files (e.g., executables, binaries, etc.) to execute the processes contained in the container. Typically, a container has its own container namespace on a storage resource to which files can initially be loaded. After the files are loaded, the container can open the files from its own container namespace and access the file data in the opened files to execute the processes.

SUMMARY

The techniques and systems described herein reduce the amount of storage resources consumed by containers by using a read-only namespace that is shared across multiple containers.

In various examples described herein, a container is launched and placeholder file(s) are created within the container's own container namespace, where the placeholder file(s) are associated with shared files (e.g., package layers for an operating system) to be accessed in read-only fashion. Then, a request from the container to access a file is passed to the container's own container namespace and a placeholder file is opened. A tag (e.g., an error message, a reparse status, etc.) is received from the container namespace indicating that data of the file is not stored in the container's own container namespace (e.g., is not accessible via the opened placeholder file). Subsequently, a corresponding shared file in the read-only namespace is opened and read requests are redirected from the opened placeholder file in the container namespace to the opened shared file in the read-only namespace. A placeholder file can be created (e.g., by a file system filter) in response to a request from the container to access a file in its own container namespace (e.g., at a time after the container is launched). Alternatively, a placeholder file can be created in association with the launching of the container (e.g., a set of placeholder files is automatically created upon launch for a predetermined set of files in particular package layers). In addition to redirecting accesses for read-only files, the systems and techniques are also configured to ensure that a modification to a file is isolated to a specific container namespace associated with the container performing the modification.

In further examples described herein, a container is launched and a placeholder directory is created within the container's own container namespace, where the placeholder directory is created based on a shared directory in a read-only namespace. Then, a request from the container to access a file in the placeholder directory is received and contents of the placeholder directory are populated based on the access (e.g., placeholder child- or sub-directories and/or a placeholder file for the accessed file are populated within the initial placeholder directory). The systems and techniques are also configured to ensure that a modification (e.g., renaming or deleting a placeholder file or a placeholder sub-directory) to a placeholder directory is isolated to a specific container namespace associated with the container performing the modification.

In even further examples described herein, the systems and techniques can load shared files into a memory execution area that is shared amongst a plurality of different containers and corresponding container namespaces. For instance, the shared memory execution area is backed by a same copy of a shared file in the read-only namespace.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, engine(s), module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical components.

DETAILED DESCRIPTION

The techniques and systems described herein enable high density container operation for a storage unit. In various examples, a container comprises an isolated resource control mechanism from which one or more processes (e.g., processes that comprise an application) can execute without affecting other system or host infrastructure outside the container. For example, a container can run an operating system (often with a subset of operating system components), a container can have a file system, and/or a container can be accessed over a network as if it were a physical computer system (e.g., a computer system that executes in isolation).

As described above, a container relies upon access to files (e.g., executables, binaries, etc.) to execute the processes contained in the container. In some instances, a container may be associated with a job. A container has its own container namespace (e.g., storage volume) on a storage resource (e.g., a server in a data center). A container namespace provides a view, to the container, of the files.

The techniques and systems described herein reduce the amount of storage resources consumed by containers by creating placeholder files in container namespaces. The placeholder files are associated with read-only access to corresponding shared files stored in a read-only namespace. The read-only namespace can be accessible to multiple different containers. This increases the storage density for a storage unit because more containers can be executed from the same storage unit. The techniques and systems described herein further reduce the amount of storage resources consumed by containers by creating placeholder directories. The techniques and systems described herein also reduce the amount of storage resources consumed by containers to execute files by using a shared execution memory area.

Figure 1:
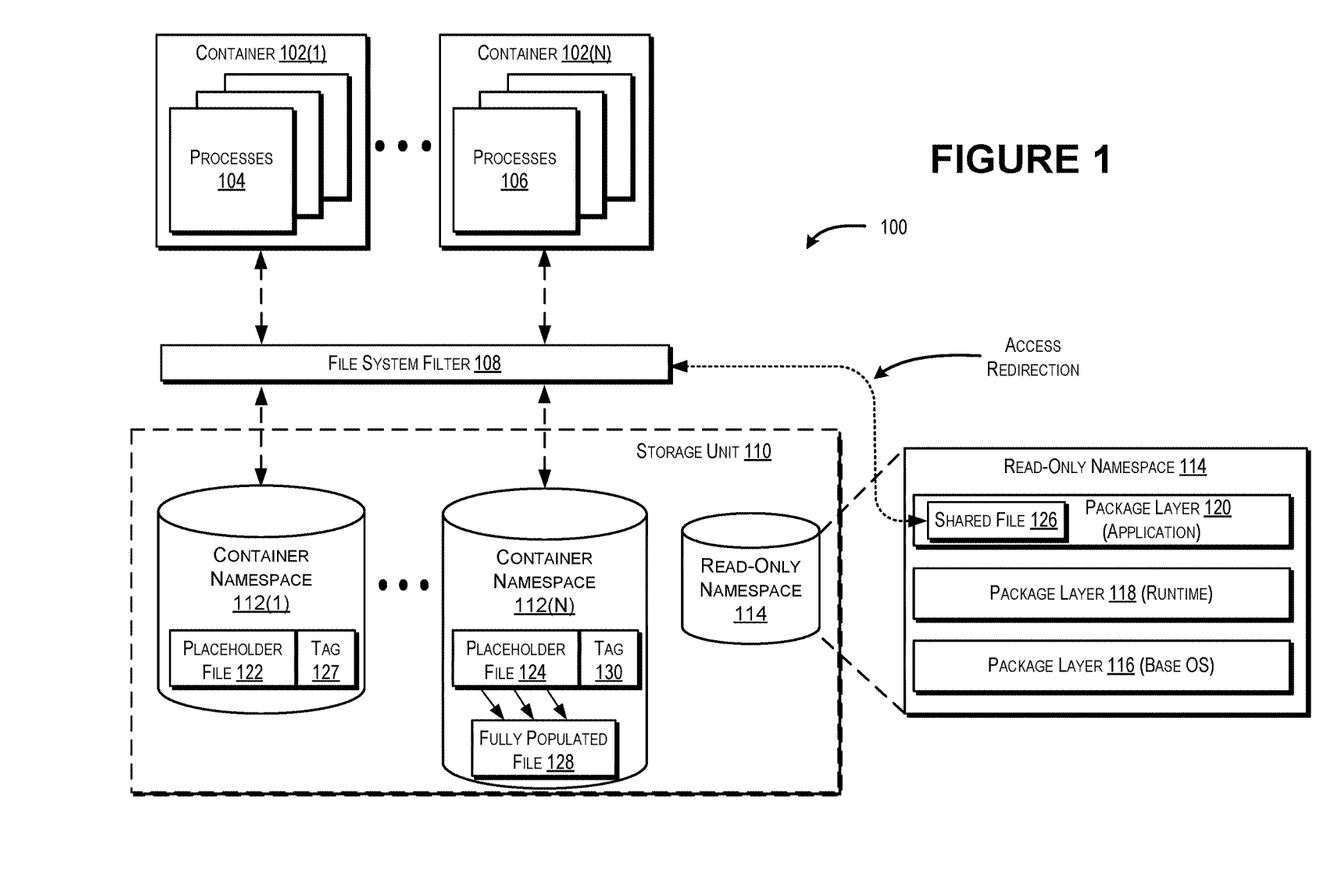
FIG. 1 is a block diagram depicting an example environment for creating placeholder files in container namespaces.

FIG. 1 is a block diagram depicting an example environment 100 for creating placeholder files in container namespaces. FIG. 1 illustrates multiple containers 102(1) . . . 102(N), where N represents a number of containers (e.g., run by a host as described with respect to FIG. 8). Container 102(1) includes one or more processes 104 and container 102(N) includes one or more processes 106. FIG. 1 further illustrates a file system filter 108 configured between the containers 102(1) . . . 102(N) and a storage unit 110. As described above, each container has its own container namespace (e.g., a container volume), and thus, container 102(1) is associated with container namespace 112(1) and container 102(N) is associated with container namespace 112(N). Examples of a storage unit 110 include: a machine (e.g., a server), a disk, a platter, a sector, and so forth. In some instances, storage units can be arranged into a "rack" (e.g., a row) and multiple racks of storage units can be arranged into a "grid" of storage units (e.g., configured within a data center).

As further described herein, a container namespace can be formed, in part, by overlaying read-only files from a read-only namespace 114. Therefore, the read-only namespace 114 can include a set of files (e.g., executables, binaries, etc.) that individually can be shared across multiple different containers 102(1) . . . 102(N) and/or multiple different container namespaces 112(1) . . . 112(N). In various examples, the read-only namespace 114 can include one or more package layers, where each package layer can contain one or more files (e.g., files that can be expanded into an operating system directory). In FIG. 1 for example, a first package layer 116 can be associated with a base operating system (OS) layer of a host, a second package layer 118 can be associated with a runtime layer, and a third package layer 120 can be associated with an application layer.

To achieve high container density for the storage unit 110 (e.g., storing more container namespaces on an individual server and reducing the amount of storage typically used to store the container namespaces), FIG. 1 illustrates that container namespace 112(1) includes a placeholder file 122 and that container namespace 112(N) includes a placeholder file 124. In one example, a placeholder file can be created (e.g., by the file system filter 108) when a container opens a file in its container namespace (e.g., at a time after the container is launched). In another example, a placeholder file can be created in association with a container being launched (e.g., a set of placeholder files is created for a predetermined set of files in particular package layers). A placeholder file is a file that represents a shared file. However, the shared file contains the actual file data, and therefore, the placeholder file is smaller in size compared to the shared file because the placeholder file does not contain the actual file data contained in the shared file. Rather, the placeholder file only contains metadata of the shared file (e.g., security descriptors of the file, attributes of the file, extended attributes of the file, etc.). Consequently, a placeholder file is a representation of an actual file without the actual file data and the placeholder file is located in the file system (e.g., one of container namespaces 112(1) . . . 112(N)) that is accessed by the container (e.g., made accessible to the container).

Consequently, both placeholder file 122 and placeholder file 124 are instances of files that individually represent the same shared file 126 (e.g., each placeholder file contains metadata of the shared file 126). The file system filter 108 virtualizes the placeholder files 122, 124 for the containers 102(1) . . . 102(N). For example, when a container opens and/or accesses a file, the file system filter 108 provides access to file data that appears to come from the placeholder file (e.g., the file system filter 108 provides a container 102(1) with a view into its own container namespace 112(1)), but the file data is actually read from a shared location outside the container's own container namespace (e.g., a location within the read-only namespace 114). In various examples, due to the use of placeholder files, a container namespace is able to handle namespace operations (e.g., lock, exclusive read, exclusive write, etc.) while the file system filter 108 is tasked with redirecting input/output.

When the container 102(1) opens the placeholder file 122 in order to request to read data, the file system filter 108 passes the request to the container namespace 112(1) (e.g., to an input/output (I/O) stack of the container namespace 112(1)). The container namespace 112(1) then determines that the file to be opened is a placeholder file 122 based on an associated tag 127. In various examples, the tag 127 comprises a reparse point. The tag 127 indicates, to the container namespace 112(1), that another component outside the container namespace 112(1) is involved in the opening of the file and the container namespace 112(1) returns the tag 127 (e.g., a status reparse, an error code, etc.). The tag 127 ultimately is passed back up to the file system filter 108, and since the file system filter 108 owns the tag 127 (e.g., the file system filter 108 is the other component involved in the opening of the file), the file system filter 108 prepares to redirect read requests from container 102(1) to the shared file 126 in the read-only namespace 114, the shared file 126 corresponding to the placeholder file 122. In one example, the file system filter 108 prepares to redirect read requests by opening the shared file 126. With both the placeholder file 122 and the shared file 126 open, the file system filter 108 can redirect read requests from the placeholder file 122 to the shared file 126 such that it appears the read was performed on the placeholder file 122. Stated another way, the file data can be loaded for the container 102(1) from the shared file 126 in the read-only namespace 114, even though the container 102(1) thinks the file data is being loaded from the placeholder file 122 in its own container namespace 112(1).

In addition to redirecting accesses for read-only files, the file system filter 108 is also configured to ensure that a modification to a file is isolated to a specific container namespace associated with the container performing the modification. Stated another way, the file system filter 108 is configured to provide copy-on-write behavior for the container namespaces 112(1) . . . 112(N). For example, if container 102(N) writes to placeholder file 124 (e.g., attempts to modify file data it is configured to access via placeholder file 124), the placeholder file 124 is converted by the file system filter 108 into a fully populated file 128 that contains the actual file data. The file system filter 108 performs the conversion by populating the placeholder file 124 with the actual file data from the shared file 126 (e.g., the shared file 126 is loaded into the container namespace 112(N) and the write is performed). Since an access to this file within container namespace 112(N) no longer needs to be redirected to the shared file 126 in the read-only namespace 114, the file system filter 108 removes the associated tag 130 (e.g., a reparse point) from the fully populated file 128.

Consequently, the file system filter 108 is able to isolate any modifications so that they are specific and/or private to the container that performed the modifications to a file. This protects the integrity of the shared file 126 that is used by multiple different container namespaces 112(1) . . . 112(N). For instance, an access to placeholder file 122 via a container namespace 112(1) is still redirected by the file system filter 108 to shared file 126, but an access to the corresponding file within container namespace 112(N) is not redirected by the file system filter 108 to the shared file 126 due to a modification and the copy-on-write behavior that creates the fully populated file 128 within container namespace 112(N).

In various examples, a location (e.g., layer) in which modifications to a file are made by a container can be referred to as a top layer or a scratch layer of a file system. The file system filter 108 captures any file data specific or private to the container in this top layer or scratch layer such that the modifications are isolated from other containers and/or container namespaces that operate in association with the storage unit 110 and/or a host entity.

In various examples, if a file is contained in more than one layer (e.g., multiple layers overlap), the file in an upper-most layer supersedes (e.g., the scratch layer or the application layer 120) any files in a lower layer (e.g., the base OS layer 116). A new layer can be generated by launching a container, running installers for the desired software and committing the changes. A layer can then be committed or installed (e.g., as a directory) on a container namespace, the read-only namespace, or a host namespace (e.g., a storage volume accessible to a host entity).

Accordingly, by leveraging the shared files in the read-only namespace 114, a higher container storage density for the storage unit 110 can be achieved. That is, rather than multiple container namespaces each including fully populated files that are the same, the multiple container namespaces can access a shared file via a location (e.g., the read-only namespace) external to their respective container namespaces as long as the shared file is only being read (and not written to).

FIGS. 2, 3, 5, and 6 individually illustrate an example process for employing the techniques described herein. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device or a system to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 2:
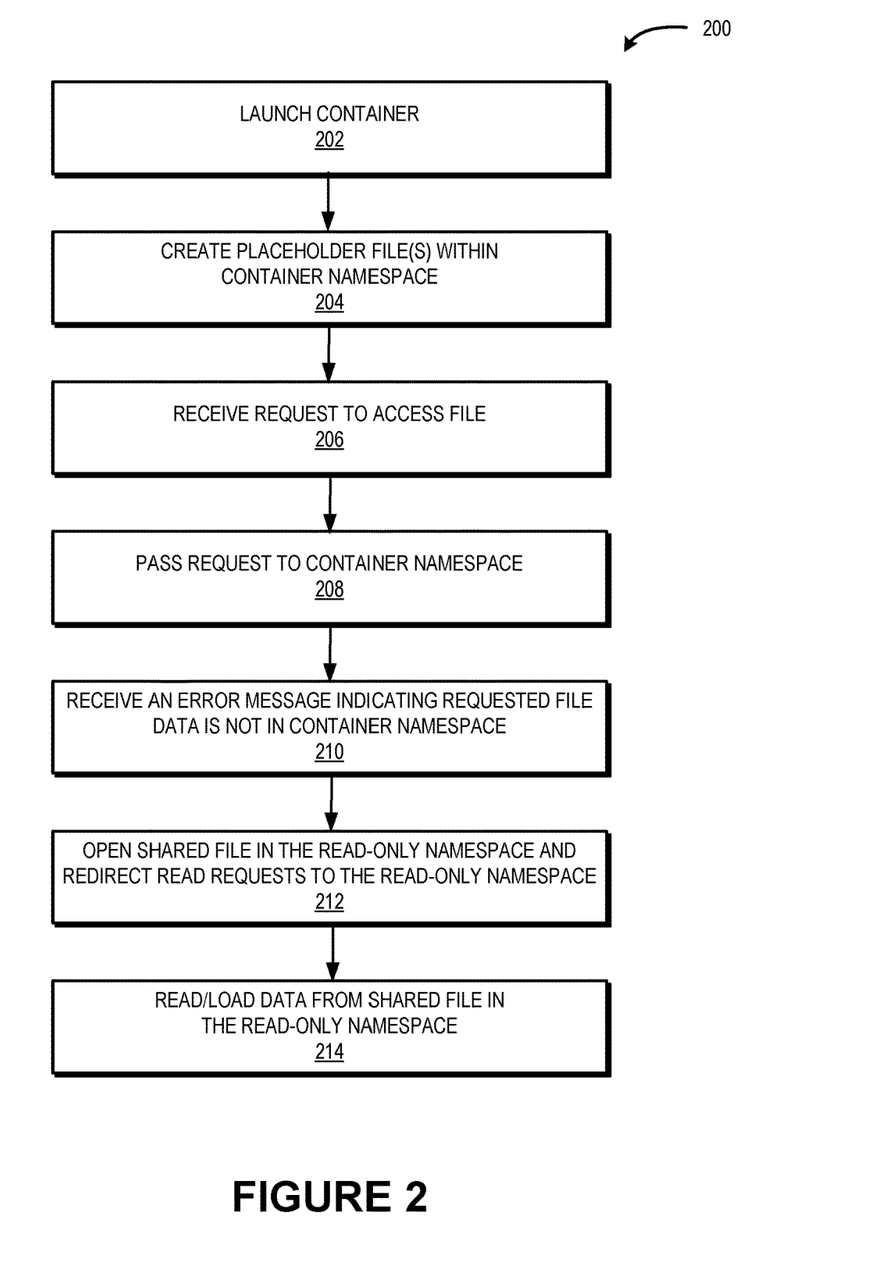
FIG. 2 is a flow diagram of an example process that redirects a file access for a container from the container's own container namespace to a read-only namespace.

FIG. 2 illustrates a flow diagram of an example process 200 that redirects a file access for a container from the container's own container namespace to a read-only namespace. The example process 200 can be implemented in association with the components illustrated in FIG. 1 (e.g., by the file system filter 108 operating in association with a host entity).

At 202, a container is launched. At 204, placeholder file(s) are created within the container's own container namespace, where the placeholder file(s) are associated with shared files (e.g., package layers for an operating system) to be accessed in read-only fashion. At 206, a request to access a file is received from the container (e.g., a request to read data). At 208, the request is passed to the container's own container namespace and a placeholder file is opened. At 210, a tag (e.g., an error message, a reparse status, etc.) is received from the container namespace indicating that the requested file data is not in the container's own container namespace (e.g., is not accessible via the opened placeholder file). At 212, a corresponding shared file in the read-only namespace is opened and read requests are redirected from the container namespace to the read-only namespace, the shared file being accessible to multiple different containers. At 214, the file data is read/loaded from the shared file in the read-only namespace.

As described above, a placeholder file can be created (e.g., by the file system filter 108) in response to a request from the container to access a file in its own container namespace (e.g., at a time after the container is launched). Alternatively, a placeholder file can be created in association with the launching of the container (e.g., a set of placeholder files is automatically created upon launch for a predetermined set of files in particular package layers).

Figure 3:
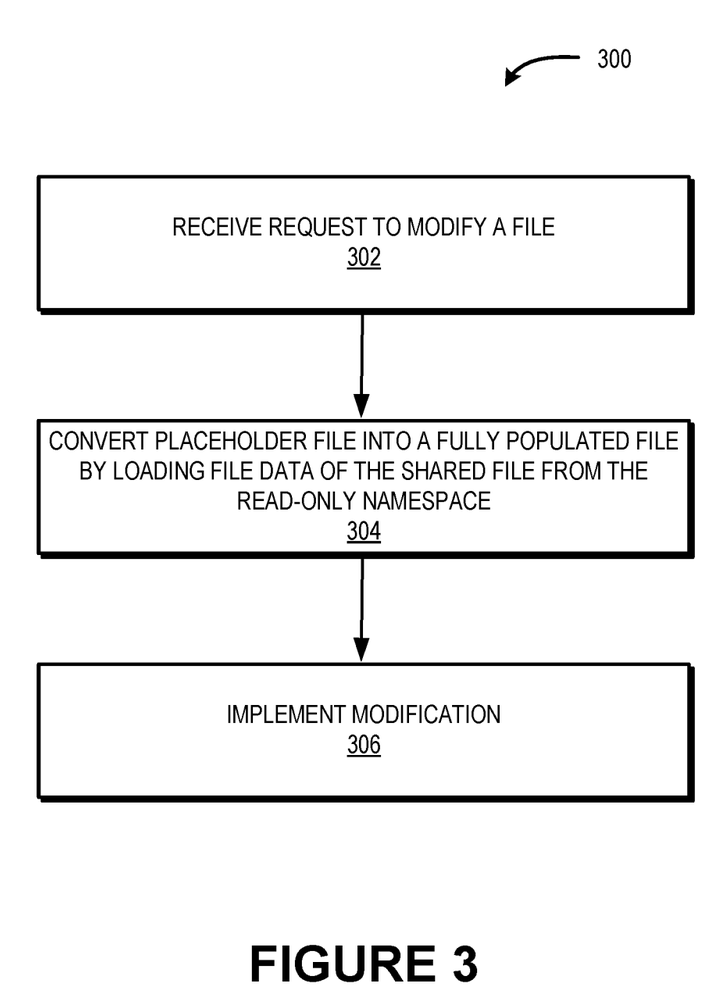
FIG. 3 is a flow diagram of an example process that handles a container's modification (e.g., a write) to a placeholder file stored in the container's own container namespace.

FIG. 3 illustrates a flow diagram of an example process 300 that handles a container's modification (e.g., a write) to a placeholder file stored in the container's own container namespace. The example process 300 can be implemented in association with the components illustrated in FIG. 1 (e.g., by the file system filter 108 operating in association with a host entity). Moreover, in various examples, the example process 300 can be implemented after the example process 200 of FIG. 2.

At 302, a request to modify a file is received from a container, where the file corresponds to a placeholder file in the container's own container namespace. At 304, the placeholder file associated with the request is converted into a fully populated file by loading the file data of the shared file from the read-only namespace to the container's own container namespace so the modification can be isolated. At 306, the modification to the fully populated file is implemented (e.g., a write is performed on the file data). To this end, the modified file data can subsequently be read by the container from the fully populated file in the container's own container namespace rather than from the shared file in the read-only namespace that is shared by multiple containers and that contains the unmodified file data.

Figure 4:
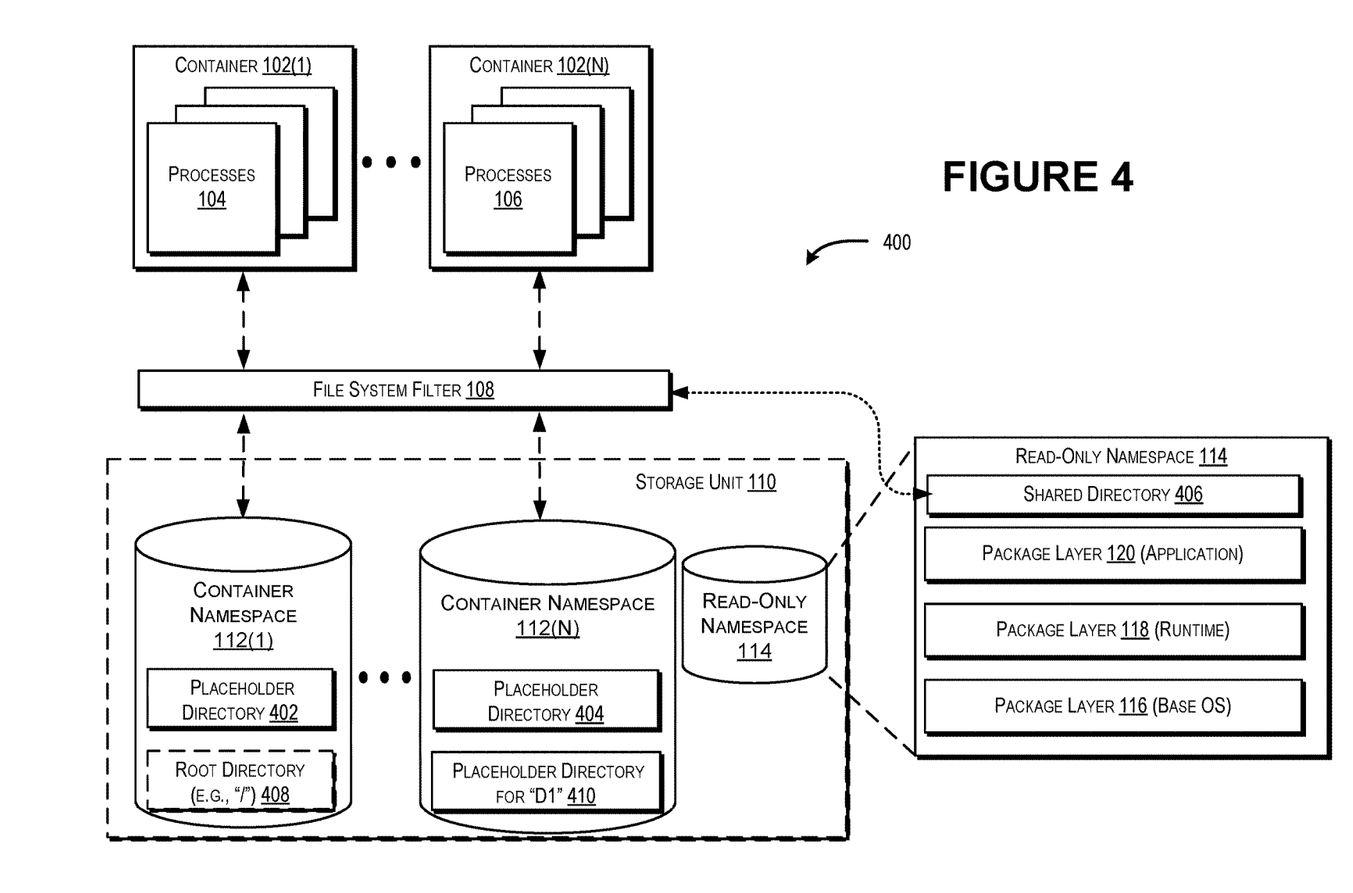
FIG. 4 is a block diagram depicting an example environment for creating placeholder directories in container namespaces.

FIG. 4 is a block diagram depicting an example environment 400 for creating placeholder directories in container namespaces. FIG. 4 is similar to FIG. 1 in that FIG. 4 illustrates the multiple containers 102(1) . . . 102(N), the file system filter 108, the respective container namespaces 112(1) . . . 112(N), and the read-only namespace 114. To conserve storage space, container namespace 112(1) includes a placeholder directory 402 and container namespace 112(N) includes a placeholder directory 404. A placeholder directory represents a corresponding shared directory 406. However, a placeholder directory has a capability of limiting the view into the contents of the directory, where the contents can include files, sub-directories, child directories, etc. For example, when a placeholder directory is enumerated, the file system filter 108 can merge the view of the placeholder directory (e.g., which may contain a placeholder file that has been opened in the container namespace) and the view of the corresponding shared directory (e.g., which may contain another file that has yet to be opened in the container namespace as described above with respect to FIG. 1).

For instance, placeholder directory 402 in container namespace 112(1) may reflect a root directory (e.g., the "I" directory) 408 (e.g., a parent node) that is not yet populated with contents (e.g., a child- or sub-directory "D1" that contains files and a child- or sub-directory "D2" that contains files). The placeholder directory 402 may only reflect the root directory (as referenced by 408) because the container 102(1) has not yet opened a file contained in "D1" and/or "D2", and thus a file accessible by a path that contains "D1" or "D2" has not yet been opened. Consequently, there may be no need to populate, in the container namespace 112(1), the placeholder root "/" directory with its contents from its corresponding shared directory 406 (e.g., the contents including "D1" and/or "D2" and the files contained therein). Rather, the file system filter 108 can enumerate the contents contained in the root "/" directory based on the corresponding shared directory 406 of the read-only namespace 114 (e.g., the shared root "/" directory).

However, for example, if the container 102(N) accesses a file in the read-only namespace 114 that exists in directory "D1" (e.g., a file in a package layer), the file system filter 108 populates the placeholder directory 404 (e.g., a root directory "/") of the container namespace 112(N) with a placeholder directory for "D1" 410, and the file system filter 108 further creates a placeholder file in the placeholder directory "D1" based on the access. Stated another way, placeholders for nodes of the directory that are along an access path are created. However, the file system filter 108 does not create a placeholder directory for "D2" in container namespace 112(N) since no files contained in "D2" have been accessed by the container 102(N).

Consequently, to conserve storage space, the file system filter 108 is configured to create and/or populate a placeholder directory for a respective container namespace, as needed (e.g., as files are accessed and opened).

The file system filter 108 is also configured to ensure that a modification to a placeholder directory is isolated to a specific container namespace associated with the container performing the modification. Stated another way, modifications such as a rename or deletion of a placeholder directory or a placeholder file in a container namespace are captured by fully populating a level (e.g., a direct parent directory containing the renamed or deleted placeholder directory or placeholder file). For instance, if shared directory "D1" contains five files, and container 112(N) renames a first placeholder file in the placeholder directory "D1", then the file system filter 108 fully populates or enumerates the placeholder directory "D1" 410 of the container namespace 112(N) with the other placeholder files for the second, third, fourth, and fifth files in the shared directory "D1". This fully expands placeholder directory "D1" 410 into a normal directory (e.g., with placeholder files representing its contents) and this expansion lets the container namespace 112(N) know that the first placeholder file has been renamed. The absence of a placeholder file in a fully expanded directory of a container namespace indicates that a file was deleted.

Figure 5:
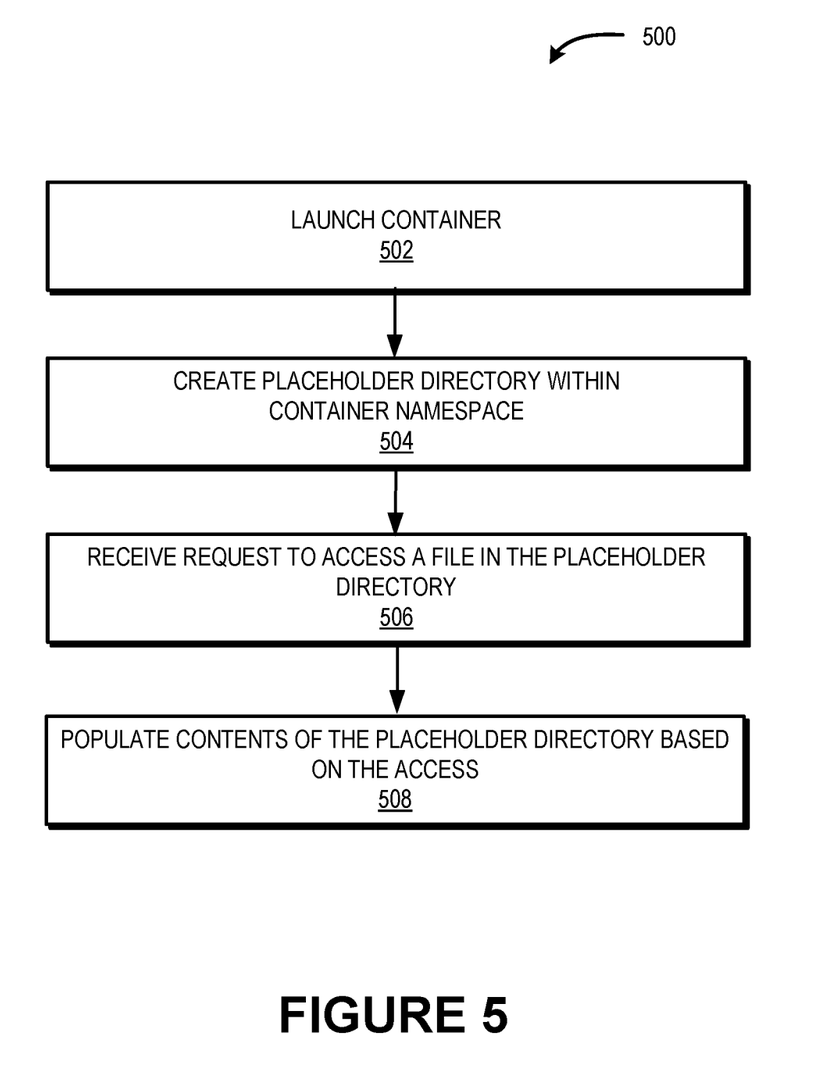
FIG. 5 is a flow diagram of an example process that creates a placeholder directory in a container namespace based on a shared directory of a read-only namespace.

FIG. 5 illustrates a flow diagram of an example process 500 that creates a placeholder directory in a container namespace based on a shared directory of a read-only namespace. The example process 500 can be implemented in association with the components illustrated in FIG. 4 (e.g., by the file system filter 108 operating in association with a host entity).

At 502, a container is launched. At 504, a placeholder directory is created within the container's own container namespace, where the placeholder directory is created based on a shared directory in a read-only namespace. At 506, a request to access a file in the placeholder directory is received from the container. At 508, contents of the placeholder directory are populated based on the access (e.g., placeholder child- or sub-directories and/or a placeholder file for the accessed file are populated within the initial placeholder directory). For example, if the container requests to open a file "F1" in a directory "D1" below the root directory, then the file system filter 108 populates the root directory with placeholder directory "D1" and a placeholder file "F1".

Figure 6:
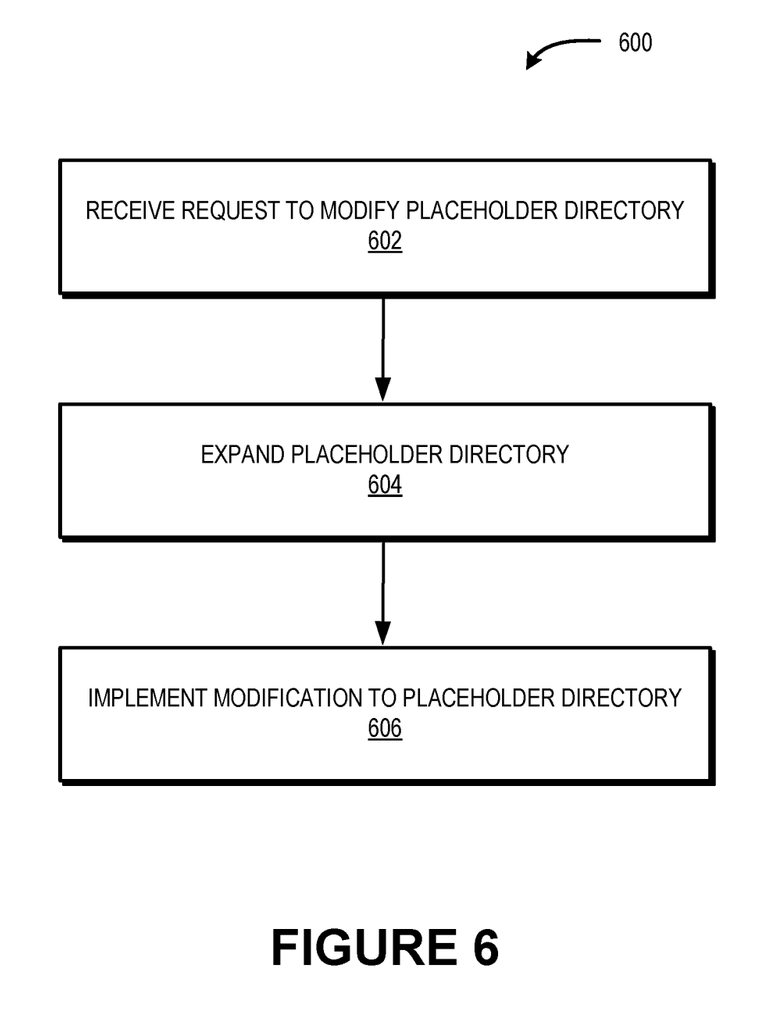
FIG. 6 is a flow diagram of an example process that handles a container's modification (e.g., a rename or a deletion) to a placeholder directory.

FIG. 6 illustrates a flow diagram of an example process 600 that handles a container's modification (e.g., a rename or a deletion) to a placeholder directory. The example process 600 can be implemented in association with the components illustrated in FIG. 4 (e.g., by the file system filter 108 operating in association with a host entity). Moreover, in various examples, the example process 600 can be implemented after the example process 500 of FIG. 5.

At 602, a request to modify the placeholder directory is received from a container (e.g., rename or delete a placeholder file or a child- or sub-placeholder directory). At 604, the placeholder directory that contains the placeholder file or the child- or sub-placeholder directory to be renamed or deleted is expanded and placeholders are created for the contents of the parent directory (e.g., placeholder files are created for the files other than the file in the placeholder directory being renamed or deleted). At 606, the modification to the placeholder directory is implemented (e.g., the placeholder file is renamed or deleted).

In various examples, the example processes described in FIGS. 5 and 6 may be implemented in association with the example processes described in FIGS. 2 and 3.

Figure 7:
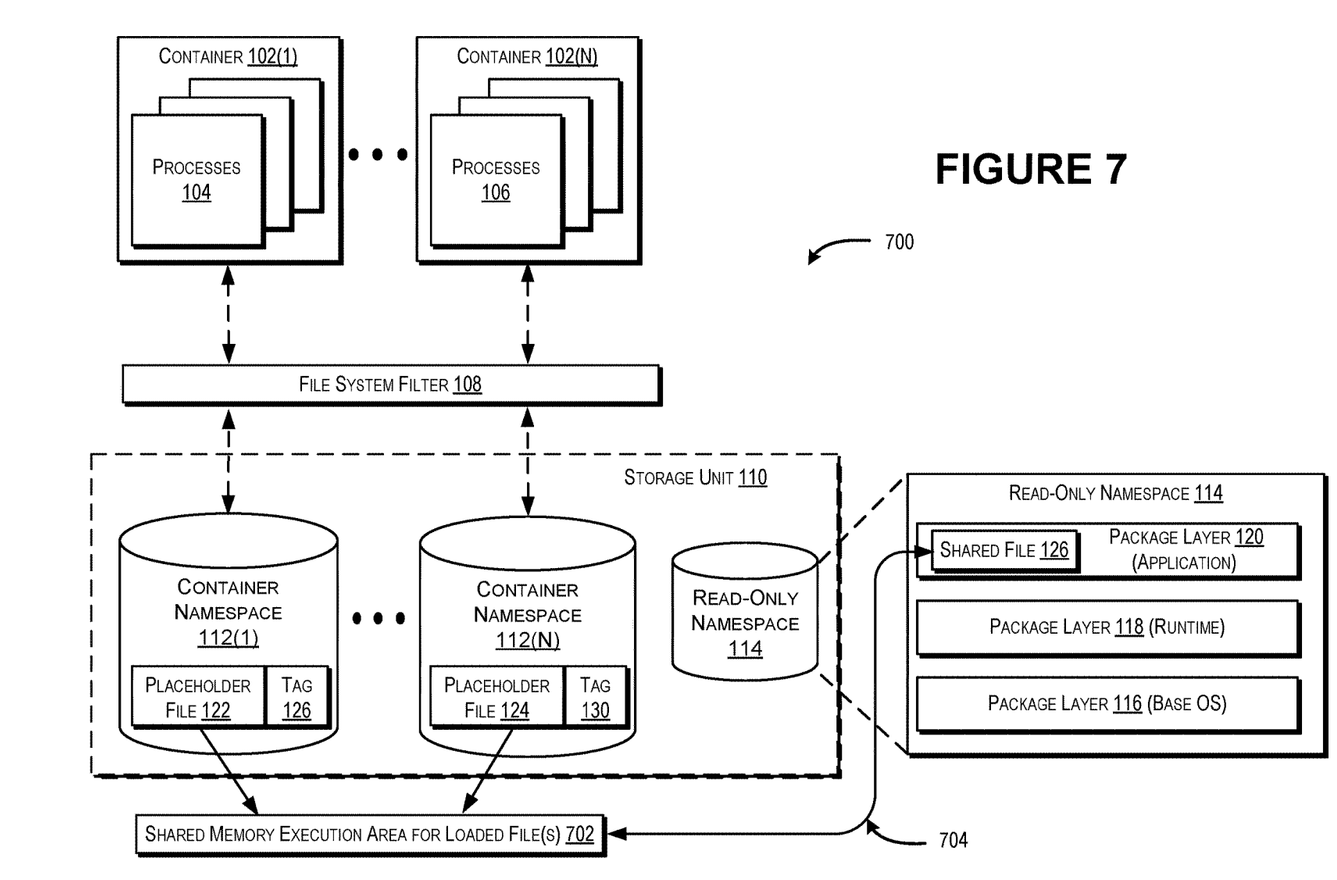
FIG. 7 is a block diagram depicting an example environment that uses a shared memory execution area for loaded files.

FIG. 7 is a block diagram depicting an example environment 700 that uses a shared memory execution area for loaded files. FIG. 7 is similar to FIGS. 1 and 4 in that FIG. 7 illustrates the multiple containers 102(1) . . . 102(N), the file system filter 108, the respective container namespaces 112(1) . . . 112(N), and the read-only namespace 114. To conserve storage space, FIG. 7 illustrates a shared memory execution area for loaded file(s) (e.g., shared files 126 accessed via the read-only namespace 114).

FIG. 1, as described above, provides access to shared files (e.g., via the redirection performed by the file system filter 108). For execution, the shared files are loaded into memory and executed. In various examples, storage unit 110 is associated with main memory or persistent memory. However, the memory from which files are executed can be cache memory or run-time memory (e.g., RAM). Thus, FIG. 7 illustrates that multiple containers 102(1) . . . 102(N) can execute shared files from the same shared memory execution area 702 rather than their own private memory execution areas. For example, the file system filter 108, or a memory manager, can load shared files into the same shared memory execution area 702 that is pointed to by the respective container namespaces 112(1) . . . 112(N), but that is backed by a same copy of the shared files 126 in the read-only namespace 114 (as referenced by 704). However, if a container modifies a file to be executed (e.g., as described above with respect to FIGS. 1 and 3), then this process involving the shared memory execution area 702 is decoupled (e.g., halted), and execution of a modified file is associated with a private memory area specific to a container namespace.

In various examples, implementation of the shared memory execution area 702 may be associated with any one of the example processes described in FIGS. 2, 3, 5, and 6.

Figure 8:
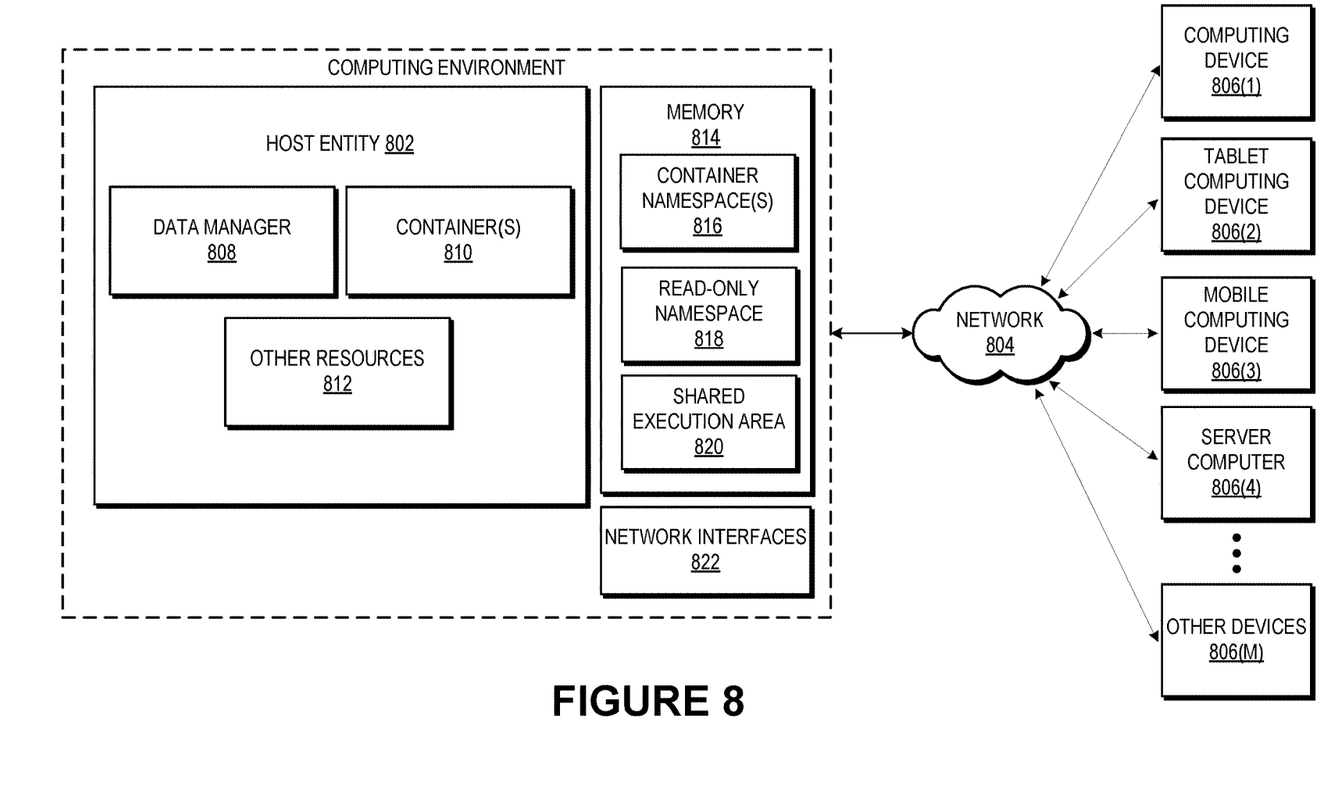
FIG. 8 a block diagram depicting an example computing environment capable of executing the techniques and systems described herein.

FIG. 8 illustrates an example computing environment capable of executing the techniques and systems described above with respect to FIGS. 1-7. In various examples, the computing environment includes a host entity 802 operating on, in communication with, or as part of a network 804. The network 804 can be or can include various access networks. For example, one or more client devices 806(1) . . . 806(M) can communicate with the computing environment via the network 804 and/or other connections. Client devices can include, but are not limited to, any one of a variety of devices, including portable devices or stationary devices. For instance, a client device can comprise a smart phone, a mobile phone, a personal digital assistant (PDA), an electronic book device, a laptop computer, a desktop computer, a tablet computer, a portable computer, a gaming console, a personal media player device, a server computer or any other electronic device.

The host entity 802 can include a data manager 808, container(s) 810 (e.g., including containers 102(1) . . . 102(N)), and other resources 812. In various implementations, the data manager 808 may be, or may contain, the file system filter 108 described above. According to various implementations, the functionality of the host entity 802 can be provided by one or more servers that are executing as part of, or in communication with, the network 804. A server can host various services, virtual machines, portals, and/or other resources, including the container(s) 810. For example, a server, via the use of containers 810, can host or provide access to one or more portals, Web sites, and/or other information.

The computing environment can include memory 814. According to various implementations, the functionality of the memory 814 also can be provided by, or part of, one or more servers configured to host data for the computing environment (e.g., including host entity 802). The memory 814 can contain persistent memory that stores container namespace(s) 816 (including container namespaces 112(1) . . . 112(N)) and a read-only namespace 818 (e.g., including read-only namespace 114). The memory 814 can also contain cache memory for a shared execution area 820 (e.g., including shared execution area 702). In various implementations, components of the host entity 802 (e.g., the data manager 808, the container(s) 810, other resources 812, etc.) can also reside on the memory 814 or a separate memory associated with the host entity 802.

The computing environment can also include one or more processor(s). The processor(s) can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 814.

The memory 814 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The computing environment can communicate over the network 804 via network interfaces 822. The network interfaces 822 can include various types of network hardware and software for supporting communications between two or more devices including.

In some implementations, the computing environment can operate within a network service (e.g., a cloud service, a data center, etc.). The network(s) 804 may include the Internet, a Mobile Telephone Network (MTN) or other various wired or wireless communication technologies.

EXAMPLE CLAUSES

Example A, a system comprising one or more processors; memory; a storage unit including a container namespace that provides exclusive access to a container configured to access files in the container namespace; and a file system filter stored in the memory and executable by the one or more processors to: create a placeholder file within the container namespace, the placeholder file representing a shared file stored in a read-only namespace that is accessible to a plurality of different containers, the shared file storing data that is not stored in the placeholder file; receive, from the container, a request to read the data; pass the request to the container namespace; receive an error message indicating that the data is not stored in the placeholder file in the container namespace; open, based at least in part on the error message, the shared file in the read-only namespace that stores the data; and provide, to the container, access to the data via the opened shared file in the read-only namespace instead of the placeholder file in the container namespace.

Example B, the system of Example A, wherein the shared file is one of a predetermined set of files that is part of a package layer in the read-only namespace.

Example C, the system of Example A or Example B, the file system filter further executable by the one or more processors to: convert, based at least in part on receiving a request to modify the data from the container, the placeholder file into a fully populated file by loading the data from the opened shared file in the read-only namespace to the fully populated file in the container namespace; and write a modification to the data to the fully populated file in the container namespace to isolate the modification for the container.

Example D, the system of any one of Example A through Example C, wherein the error message comprises a status reparse associated with a reparse point that is owned by the file system filter.

Example E, the system of Example D, the file system filter further executable by the one or more processors to remove the reparse point from the placeholder file in association with the converting the placeholder file into the fully populated file.

Example F, the system of any one of Example A through Example E, further comprising a memory execution area that is shared by the plurality of different containers, the file system filter further executable by the one or more processors to: load the data from the opened shared file to the memory execution area that is shared by the plurality of different containers; and execute the data from the memory execution area that is shared by the plurality of different containers.

Example G, the system of any one of Example A through Example F, the file system filter further executable by the one or more processors to open the placeholder file, wherein the access to the data provided to the container via the opened shared file comprises read-only access in response to read requests from the container being re-directed from the opened placeholder file to the opened shared file.

Example H, the system of any one of Example A through Example G, wherein the placeholder file only contains metadata of the shared file.

While Example A through Example H are described above with respect to a system, it is understood in the context of this document, that the subject matter of Example A through Example H can additionally and/or alternatively be implemented: as a method, via executable instructions stored on one or more computer storage media, and/or by a device.

Example I, a system comprising: one or more processors; memory; a storage unit including a container namespace that provides exclusive access to a container configured to access files in the container namespace; and a file system filter stored in the memory and executable by the one or more processors to: receive, from the container, a request to access a file; create, based at least in part on the request to access the file, a placeholder file within the container namespace, the placeholder file representing a shared file stored in a read-only namespace that is accessible to a plurality of different containers, the shared file storing data that is not stored in the placeholder file; receive, from the container, a request to read the data; pass the request to the container namespace; receive an error message indicating that the data is not stored in the placeholder file in the container namespace; open, based at least in part on the error message, the shared file in the read-only namespace that stores the data; and provide, to the container, access to the data via the opened shared file in the read-only namespace instead of the placeholder file in the container namespace.

Example J, the system of Example I, the file system filter further executable by the one or more processors to: convert, based at least in part on receiving a request to modify the data from the container, the placeholder file into a fully populated file by loading the data from the opened shared file in the read-only namespace to the fully populated file in the container namespace; and write a modification to the data to the fully populated file in the container namespace to isolate the modification for the container.

Example K, the system of Example I or Example J, wherein the error message comprises a status reparse associated with a reparse point that is owned by the file system filter.

Example L, the system of Example K, the file system filter further executable by the one or more processors to remove the reparse point from the placeholder file in association with the converting the placeholder file into the fully populated file.

Example M, the system of any one of Example I through Example L, further comprising a memory execution area that is shared by the plurality of different containers, the file system filter further executable by the one or more processors to: load the data from the opened shared file to the memory execution area that is shared by the plurality of different containers; and execute the data from the memory execution area that is shared by the plurality of different containers.

Example N, the system of any one of Example I through Example M, the file system filter further executable by the one or more processors to open the placeholder file, wherein the access to the data provided to the container via the opened shared file comprises read-only access in response to read requests from the container being re-directed from the opened placeholder file to the opened shared file.

Example O, the system of any one of Example I through Example N, wherein the placeholder file only contains metadata of the shared file.

While Example I through Example O are described above with respect to a system, it is understood in the context of this document, that the subject matter of Example I through Example O can additionally and/or alternatively be implemented: as a method, via executable instructions stored on one or more computer storage media, and/or by a device.

Example P, a system comprising: one or more processors; memory; a storage unit including a container namespace that provides exclusive access to a container configured to access files in the container namespace; and a file system filter stored in the memory and executable by the one or more processors to: create a placeholder directory within the container namespace, the placeholder directory representing a shared directory of a read-only namespace that is accessible to a plurality of different containers, the shared directory including content that is not included in the placeholder directory; receive, from the container, a request to access a file; and populate, based at least in part on the request to access the file, the placeholder directory with at least some of the content included in the shared directory.

Example Q, the system of Example P, wherein the at least some of the content comprises one or more directory nodes along a path that provides access to the file.

Example R, the system of Example P or Example Q, wherein the at least some of the content comprises a placeholder file that represents a shared file stored in the read-only namespace, the shared file corresponding to the file that is requested to be accessed.

Example S, the system of Example R, the file system filter further executable by the one or more processors to: receive, from the container, a request to rename or delete the placeholder file in the placeholder directory; and create, based at least in part on the request to rename or delete the placeholder file, placeholder files for other shared files in the shared directory so that the placeholder directory provides a view to a modification that is specific to the container; and rename or delete the placeholder file.

Example T, the system of Example R or Example S, the file system filter further executable by the one or more processors to associate a tag with the placeholder file, the tag indicating that the file system filter is involved in redirecting a request to read data from the shared file.

While Example P through Example T are described above with respect to a system, it is understood in the context of this document, that the subject matter of Example P through Example T can additionally and/or alternatively be implemented: as a method, via executable instructions stored on one or more computer storage media, and/or by a device.

Conclusion

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A system comprising:
one or more processors;
memory;
a storage unit including a container namespace that provides exclusive access to a container configured to access files in the container namespace; and
a file system filter stored in the memory and executable by the one or more processors to:
create a placeholder file within the container namespace, the placeholder file representing a shared file stored in a read-only namespace that is accessible to a plurality of different containers, the shared file storing data that is not stored in the placeholder file;
receive, from the container, a request to read the data;
pass the request to the container namespace;
receive an error message indicating that the data is not stored in the placeholder file in the container namespace;
open, based at least in part on the error message, the shared file in the read-only namespace that stores the data;
provide, to the container, access to the data via the opened shared file in the read- only namespace instead of the placeholder file in the container namespace;
convert, based at least in part on receiving a request to modify the data from the container, the placeholder file into a fully populated file by loading the data from the opened shared file in the read-only namespace to the fully populated file in the container namespace; and
write a modification to the data to the fully populated file in the container namespace to isolate the modification for the container.

2. The system of claim 1, wherein the shared file is one of a predetermined set of files that is part of a package layer in the read-only namespace.

3. The system of claim 1, wherein the error message comprises a status reparse associated with a reparse point that is owned by the file system filter.

4. The system of claim 3, the file system filter further executable by the one or more processors to remove the reparse point from the placeholder file in association with the converting the placeholder file into the fully populated file.

5. The system of claim 1, further comprising a memory execution area that is shared by the plurality of different containers, the file system filter further executable by the one or more processors to:
load the data from the opened shared file to the memory execution area that is shared by the plurality of different containers; and
execute the data from the memory execution area that is shared by the plurality of different containers.

6. The system of claim 1, the file system filter further executable by the one or more processors to open the placeholder file, wherein the access to the data provided to the container via the opened shared file comprises read-only access in response to read requests from the container being re-directed from the opened placeholder file to the opened shared file.

7. The system of claim 1, wherein the placeholder file only contains metadata of the shared file.

8. The system of claim 1, wherein the placeholder file is automatically created within the container namespace based on the container being launched.

9. A system comprising:
one or more processors;
memory;
a storage unit including a container namespace that provides exclusive access to a container configured to access files in the container namespace; and
a file system filter stored in the memory and executable by the one or more processors to:
receive, from the container, a request to access a file;
create, based at least in part on the request to access the file, a placeholder file within the container namespace, the placeholder file representing a shared file stored in a read-only namespace that is accessible to a plurality of different containers, the shared file storing data that is not stored in the placeholder file;
receive, from the container, a request to read the data;
pass the request to the container namespace;
receive an error message indicating that the data is not stored in the placeholder file in the container namespace, wherein the error message comprises a status reparse associated with a reparse point that is owned by the file system filter;
open, based at least in part on the error message, the shared file in the read-only namespace that stores the data; and
provide, to the container, access to the data via the opened shared file in the read- only namespace instead of the placeholder file in the container namespace.

10. The system of claim 9, the file system filter further executable by the one or more processors to:
convert, based at least in part on receiving a request to modify the data from the container, the placeholder file into a fully populated file by loading the data from the opened shared file in the read-only namespace to the fully populated file in the container namespace; and write a modification to the data to the fully populated file in the container namespace to isolate the modification for the container.

11. The system of claim 9, the file system filter further executable by the one or more processors to remove the reparse point from the placeholder file in association with the converting the placeholder file into the fully populated file.

12. The system of claim 9, further comprising a memory execution area that is shared by the plurality of different containers, the file system filter further executable by the one or more processors to:
load the data from the opened shared file to the memory execution area that is shared by the plurality of different containers; and
execute the data from the memory execution area that is shared by the plurality of different containers.

13. The system of claim 9, the file system filter further executable by the one or more processors to open the placeholder file, wherein the access to the data provided to the container via the opened shared file comprises read-only access in response to read requests from the container being re-directed from the opened placeholder file to the opened shared file.

14. The system of claim 9, wherein the placeholder file only contains metadata of the shared file.

15. A system comprising:
one or more processors;
memory;
a storage unit including a container namespace that provides exclusive access to a container configured to access files in the container namespace; and
a file system filter stored in the memory and executable by the one or more processors to:
create a placeholder directory within the container namespace, the placeholder directory representing a shared directory of a read-only namespace that is accessible to a plurality of different containers, the shared directory including content that is not included in the placeholder directory;
receive, from the container, a request to access a file; and
populate, based at least in part on the request to access the file, the placeholder directory with at least some of the content included in the shared directory, wherein the at least some of the content comprises a placeholder file that represents a shared file stored in the read-only namespace, the shared file corresponding to the file that is requested to be accessed.

16. The system of claim 15, wherein the at least some of the content comprises one or more directory nodes along a path that provides access to the file.

17. The system of claim 15, the file system filter further executable by the one or more processors to:
receive, from the container, a request to rename or delete the placeholder file in the placeholder directory;
create, based at least in part on the request to rename or delete the placeholder file, placeholder files for other shared files in the shared directory so that the placeholder directory provides a view to a modification that is specific to the container; and
rename or delete the placeholder file.

18. The system of claim 15, the file system filter further executable by the one or more processors to associate a tag with the placeholder file, the tag indicating that the file system filter is involved in redirecting a request to read data from the shared file.

* * * * *